United States Patent [19]

Knop

[11] 4,092,668

[45] May 30, 1978

[54] CORRECTION CIRCUIT FOR A COLOR SCANNER

[75] Inventor: Hans-Georg Knop, Heikendorf, Germany

[73] Assignee: Dr. Ing. Rudolf Hell GmbH, Germany

[21] Appl. No.: 738,883

[22] Filed: Nov. 4, 1976

[30] Foreign Application Priority Data

Nov. 8, 1975 Germany .............................. 2550273

[51] Int. Cl.² .......................... H04N 1/46; H04N 1/40
[52] U.S. Cl. ...................................... 358/80; 358/78; 358/282
[58] Field of Search .................. 358/76, 78, 80, 75, 358/280, 282, 296, 302

[56] References Cited

U.S. PATENT DOCUMENTS 2,799,722  7/1957  Neugebauer .......................... 358/80
3,893,166  7/1975  Pugsley ................................. 358/80

*Primary Examiner*—John C. Martin
*Attorney, Agent, or Firm*—Hill, Gross, Simpson, Van Santen, Steadman, Chiara & Simpson

[57] ABSTRACT

An improved color adjustment circuit for a color scanner in which a photoelectric scanning device obtains color signals and which supplies separated output signals to color correction circuits and wherein the output of the scanning device can be disconnected from the correction circuit during adjustment of the correction circuit and wherein for each of the picture points which is to be examined a variable memory receives and stores the color signal values for the picture points from the scanning device and the outputs of these memories can be connected to the input of the correction circuit for adjusting the individual color correction values of the correction circuit.

6 Claims, 3 Drawing Figures

CORRECTION CIRCUIT FOR A COLOR SCANNER

BACKGROUND OF THE INVENTION

1. Field of the Invention

This invention relates in general to correction circuits in a color scanning and reproducing system.

2. Description of the Prior Art

In processes for reproducing color pictures, a color scanner is used to scan the picture on a point by point and line by line basis and corrected color separation signals are obtained from the picture pattern. The color separations are used for producing the printing forms of a set of color plates for the multi-color printing process.

In the color scanner, the colored picture model is mounted on a rotating scanning drum and is scanned point by point and line by line by a scanning light spot. Depending upon whether a frontal view picture model or a transparent picture model is to be reproduced, the light reflected from the picture model or the transmitted light is received by a scanning device which is moved parallel to the scanning drum and the output signals from the scanning device are separated into three color components such as red, blue and green and are separately fed to a color channel. Color filters for spectrally separating the colors of the received light provide the color separation and opto-electrical transducers obtain the three electrical signals which after logarithmation represent the color densities of the three color components of the scanned picture points.

The color signals are fed to a correction circuit at the output of which the three corrected color separation signals are available for the purpose of recording the color separations such as Magenta, Cyan and Yellow. The color separation signals are selected successively by way of a color separation switch and are then fed to a recording device which may be in the form of a recording lamp which has its luminosity modulated by the selected color separation signal. A film which serves as the recording carrier is mounted on a recording cylinder which rotates and the recording lamp moves along line by line in an axial direction relative to the recording cylinder and exposes the film in a point by point and line by line manner. The exposed and developed film is the desired color separation.

Prior to recording the color separations, the operator must carry out a number of adjustments of the device such as adjusting the white and black level calibration and the color correction.

To accomplish white and black level calibration, the three color signal values which are obtained by scanning the brightest picture point of the picture master, the so-called white point, and by scanning the darkest picture point, which is the black point, are adjusted to standardized levels in each instance.

Separate potentiometers are utilized for this purpose which however influence each other in their operation so that separate adjustments must be repeatedly accomplished and the settings if necessary corrected and for this purpose the white and black points of the model picture must be scanned by the scanning device a number of times.

On the other hand, in a true-to-color reproduction the color correction takes into account the color inadequacies of the printing inks used in the later printing processes and on the other hand makes it possible to change the color information of the reproduction as compared with the original as desired by the editor.

For this purpose, color correction signals are calculated from the color signals in the correction circuit and said correction signals are superimposed to give different weighting values to the color signals. The color signals after being influenced by the correction signals are the generated color separation signals which are available for recording purposes at the output of the correction circuit. The effectiveness of the correction signals on the color signals is determined by manually operated correction control devices in the prior art.

Generally, a fundamental first correction is accomplished and then if necessary an additional selective correction of the different color components is made.

In carrying out the first fundamental correction in each color selection channels, the color signals of the white colors are raised to the white level and the color signals of the black colors are lowered to the black level.

A correction control device for the "white colors" and a correction control device for the "black colors" are associated with each color channel. These correction control devices are initially preset to experimental values according to an available table. Variations from the values in the table result from the use of different original model materials, different printing inks are from specific reproduction desires by the editor regarding the execution of the copies. A control and if necessary a correction of the preset experimental values can be accomplished before the color separation for the corner color of the black color line (separation color) and for the corner color of the white color line (complementary color).

An additional selective color correction is carried out so as to eliminate residual errors of the fundamental correction by influencing quite specific colors or in order to meet requests of specific customers wishes relating to the color formation of the printed material. For example, correction control devices are provided for the separation colors "magenta", "cyan", "yellow" and the complimentary colors, red, green and blue. During selective correction, the scanning device must be successively adjusted to each selective color in the original picture model and the portion of the selective colors in the individual color separations is measured and if necessary corrected by the aid of correction control devices accomplishing the selective correction.

The color signal values for the individual separation colors and complimentary colors which are to be examined and possible corrected are obtained by the scanning characteristic color points of the original picture model. Since the correction control devices for the different color channels mutually influence one another, the correction parameters which have been adjusted for one color point will also have an influence on the other characteristic color point so that correction operations must be repeated in the final adjustment of the correction control device must be found through approximation and skill of the operator.

It has been shown that some of the parameters for the reproduction process can be determined only by the iterative adjustments of correction control devices and by constantly scanning of a number of characteristic color points of the original picture model. This prior art conventional procedure has the disadvantage in that the operator must repeatedly bring the same designated color point into the optical axis of the scanning device by means of moving the scanning device and rotating the scanning drum. This operation is therefore very laborious and time consuming. Since the specific color points cannot be marked it cannot be assured that the same color points are always located and scanned a second time and the same color signal values are formed for control purposes. However, for using a scanner economically, it is necessary that the adjustment time of a reproduction process be as small as possible as compared with the time required for the recording of the color separations. However, a shorter adjustment times can only be achieved if as many adjustments as possible are simplified or carried out automatically.

SUMMARY OF THE INVENTION

It is an object of the present invention therefore, to provide an improved apparatus and method for adjusting the correction circuit for the color signals so that the total adjustment time for reproduction is considerably shortened and a higher degree of precision can be achieved in order that the operator may be relieved of routine adjustment tasks.

In the present invention, correction values for different points of the master are scanned and stored in a memory device such that they can be reused so as to properly set and adjust the correction circuits of the apparatus.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
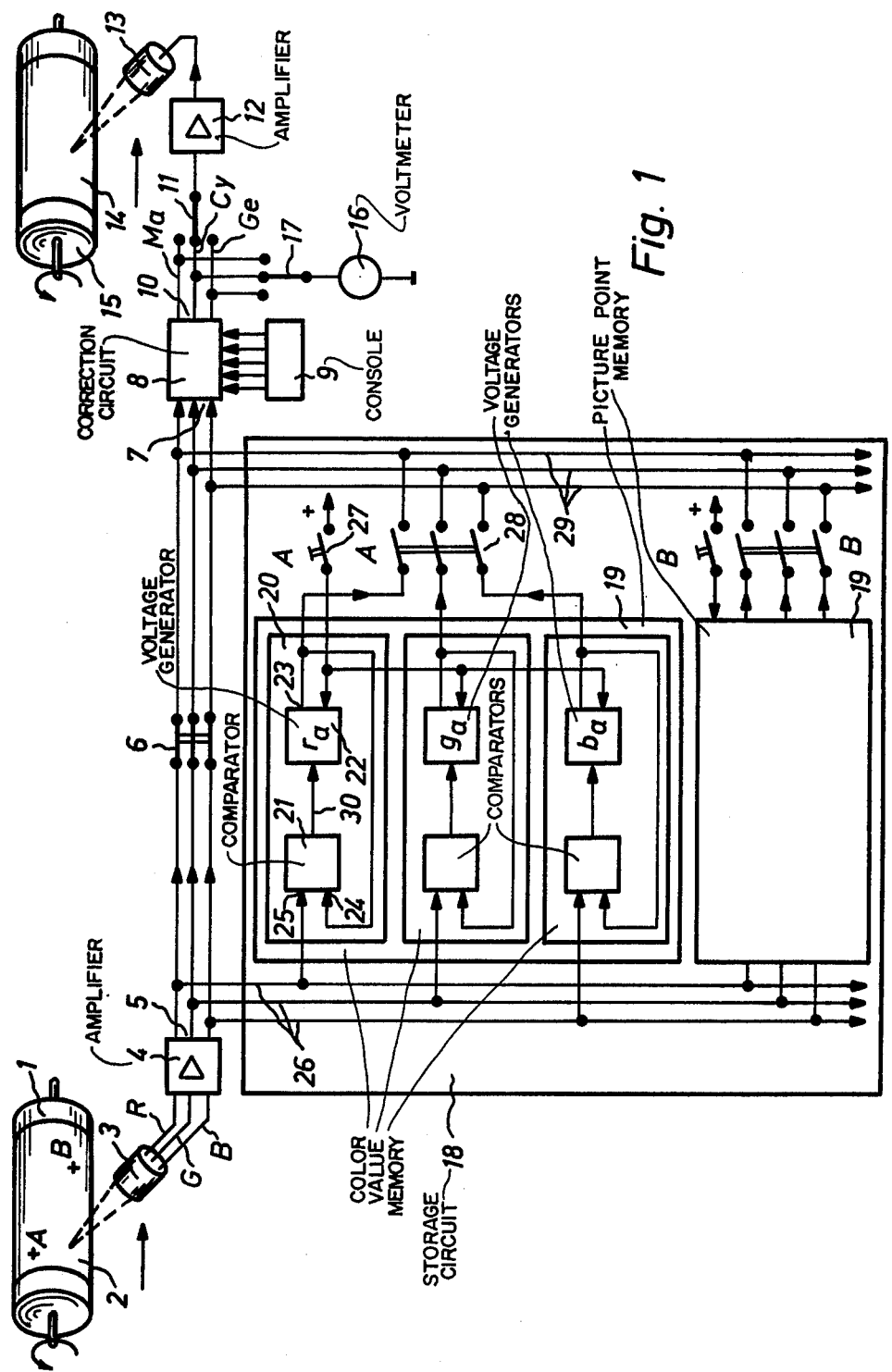
FIG. 1 is a block circuit diagram of a color scanner illustrating a sample embodiment of the storage apparatus of the invention.

A color picture original 2 is mounted on a rotating scanning cylinder 1 which is driven by a suitable motor not shown and is scanned point by point and line by line by a light spot of a non-illustrated light source.

For a frontal view picture scanning device the reflected light and in the case of a transparent picture master the transmitted light impinges on a scanning device 3 which is moved parallel to the scanning cylinder 1 so as to scan the picture model line by line and point by point. In the scanning device 3, the color signals "red", (r) "green" (g), and "blue" (b) are produced and separated by a spectral color separation using color filters and opto-electronic converters. Such color signals represent the color components of the scanned picture points. The color signals are amplified and supplied separately to the amplifier 4 and fed as inputs 7 to a correction circuit 8. A switch 6 is connected in the line between the outputs 5 of the amplifier 4 and the input 7 of the correction circuit 8. The correction circuit 8 can be adjusted by a correction control devices including an operator panel or a console 9 by an operator.

At the outputs 10 of the correction circuit 8, the corrected color separation signals are available for recording the color separations "magenta", "cyan" and "yellow". The outputs 10 of the correction circuit 8 are connected to a color separation switch 11 to which one of the three color separation signals are respectively supplied to a recording device 13 by way of amplifier 12. Recording film 14 is mounted on the recording cylinder 15 which rotates so that the recording device 13 which has a lamp whose intensity is modulated by the selected color separation signal can expose the film at the recording device 13 moves line by line relative to the recording cylinder 15. The film 14 is exposed point by point and line by line in this fashion. The exposed and developed film comprises the desired color separation. In the correction circuit 8, prior to recording the adjustment balancing and equalization of the color signals to the white and black levels and the color corrections according to the desired reproduction are accomplished. For this purpose, the operator must set the scanning device 3 to the white point, the black point and a number of characteristic color points on a picture model 2 and he must measure the color signal values $r$, $g$, and $b$ and compare them with predetermined values and if necessary correct them with the aid of the correction control device of the operator panel 9.

In the sample embodiment illustrated in FIG. 1, the picture model 2 exhibits two designated picture points A and B. The picture point A has color signal values of $r_a$, $g_a$, and $b_a$ whereas picture point B has color signal values of $r_b$, $g_b$, and $b_b$.

So as to control the color signal values, a voltmeter 16 is provided which can be selectively connected to the individual color channels at the output 10 of the correction circuit 8 by means of the switch 17.

As stated before the correction control devices influence one another in their effect on the color signals so that an iterative adjustment of the correction parameters are necessary which in systems of the prior art required that a plurality of characteristic picture points of the picture model 2 had to be repeatedly scanned.

The present invention eliminates this requirement for repeating scanning of selected picture points of the picture model and requires that such selected picture points be scanned only once and then the color signal values for each picture point is stored where it can be recalled as desired.

The stored color signal values for the selected picture points can then when needed be recalled for the purpose of control and correction and can be fed to the correction circuit 8 without the necessity of repeatedly scanning the respective picture points.

The invention, for this purpose, provides a storage circuit 18 which contains a picture point memory 19 for each designated picture point. Since the picture point memories 19 for each of the picture points are constructed identically only one such memory is illustrated in detail in FIG. 1. As shown in FIG. 1, a picture point memory 19 consists of three color value memories 20 each constructed so as to have a comparator 21 and a voltage generator 22 which is connected to the output of the comparator 21. The output 28 of the voltage generator 22 also supplies an input to the comparator 21 at its first input 24. The second input 25 of the comparator 21 receives the associated color signal on the outputs 5 of the amplifier 4 via lines 26. Thus, the color signal values $r$, $g$ and $b$ of the picture points which has just been scanned are respectively supplied to the second inputs 25 of the comparators 21 associated with the three colors. A storage switch 27 is connected to the voltage generators 22 to supply power to them to energize the voltage generators.

For each particular picture point, there will be a stored color value tripple which is availabe on the outputs 23 of the voltage generators 22 of each picture point memory 19 and these outputs can be selectively connected by recall switches 28 and lines 29 to the different color inputs 7 of the correction circuit 8.

In FIG. 1, the storage circuit 18 only contains memories for two picture points but, of course, it is to be realized that the storage circuit 18 can be expanded to store the color data for more than two points by merely adding components.

The storage circuit 18 operates in the following manner. First the scanning device 3 is set to produce an output from picture point A. The color signal values $r_a$, $g_a$, and $b_a$ are then supplied from the amplifier 4 through lines 26 to the second inputs 25 of the three comparators 21 in the storage circuit 18. The operator then closes the storage switch 27 designated by "A" and the voltage generators 22 of the respective picture point memories 19 will be turned on. The voltage generators 22 then produce comparison signals $a_1$, $a_2$ and $a_3$, which depending upon the input values connected to the respective comparators 21 have a monotonically increasing or monotonically decreasing voltage gradient.

If the input voltages applied to the comparators 21 are equal such that $a_1$ equals $r_a$, $a_2$ equals $g_a$ and $a_3$ equals $b_a$ the comparators 21 will supply control signals to the respective voltage generators 22 through leads 30 and the instantaneously obtained voltage values of the comparison signals will be fixed and retained even if the input values of the comparators 21 subsequently change.

After the values for picture point A have been stored, the scanning device 3 is moved to obtain signals from the picture point B. Then the storage switch 27 designated B in FIG. 1 is depressed so as to energize the picture point memory 19 for point B and the same procedure is repeated so as to store in the picture point memory 19 the values for picture point B.

When all the desired picture points have been stored correction can be initiated.

The switch 6 is open to disconnect the outputs 5 from the amplifier 4 to the correction circuit 8 so as to prevent color signals produced as a result of unintentional scanning of any picture point of the picture model 2 from reaching the input 7 of the correction circuit 8 and therefore interfering with the correction process.

During correction, the operator can recall all of the stored values of the picture points by depressing the corresponding recall keys or switches 28 associated with the corresponding picture point memory 19 without having to repeatedly scan the particularly picture points with the scanning device 3.

After the correction has been accomplished, the recording of the color separations proceeds and the switch 6 is closed for this purpose. During reproduction, the storage circuit 18 is inactive.

Instead of using the color signal values $r$, $g$ and $b$ obtained as a result of scanning specific picture points of the picture model it would also be possible to store in the storage circuit 18 predetermined or calculated signal values as nominal values for use during a correction operation.

For example, these signal values could be the mean gray or half tone values which are required for the adjustment of the gradiation. These mean gray half tone values can be calculated from the white point and black point of the picture model.

Figure 2:
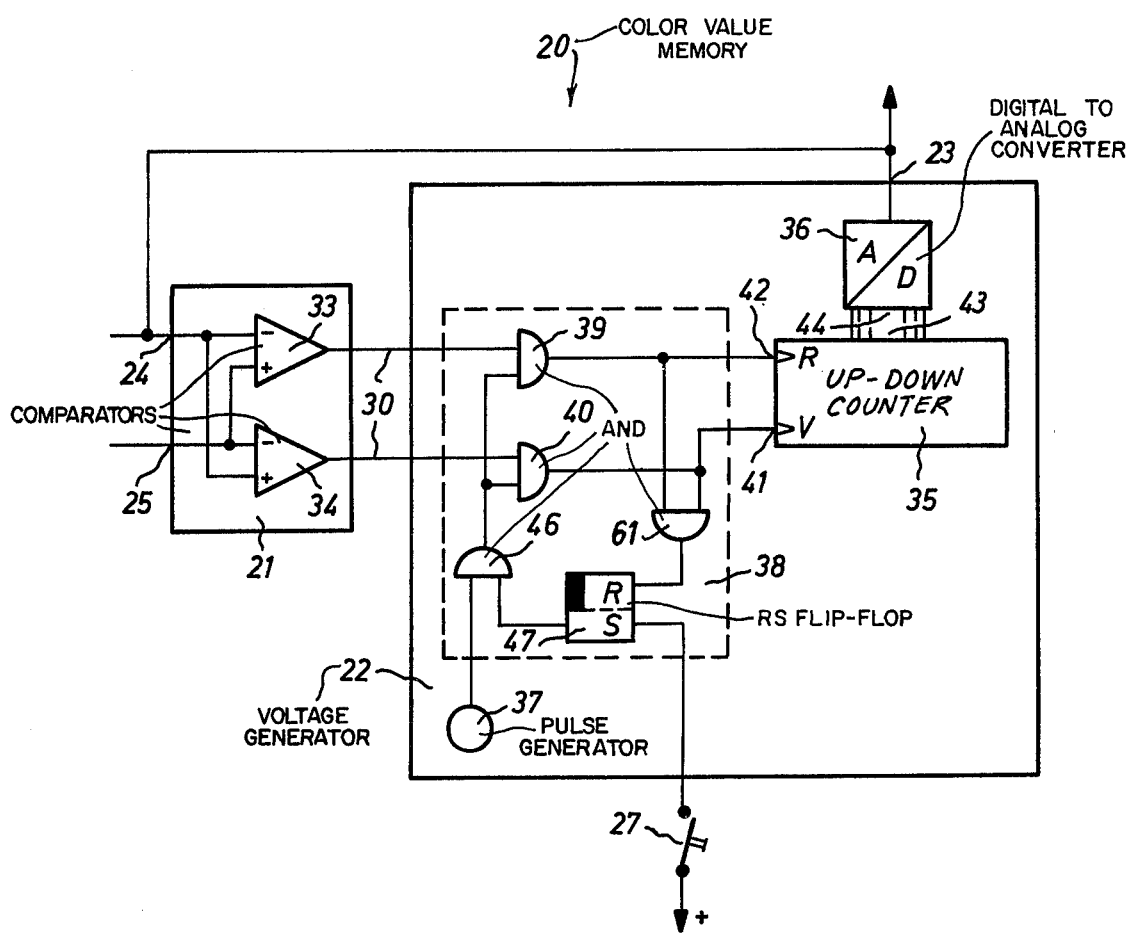
FIG. 2 is a circuit diagram of the color value memory device.

FIG. 2 is a detailed sample embodiment for a color value memory 20 having a comparator 21 and a voltage generator 22. The comparator 21 includes two comparators 33 and 34 which compare analogue input signal values.

The non-inverting input of the comparator 33 and the inverting input of comparator 34 are commonly connected together and to the input 25 of the comparator 21. The inverting input of the comparator 33 and the non-inverting input of the comparator 34 are connected to output 23 of the voltage generator 22 which is connected to the input 24 of the comparator 21.

The comparators 33 and 34 may be, for example, modules such as type LM 311 obtainable from National Semiconductors company. These modules provide a TTL output level so that they can be directly combined with logic circuits.

The voltage generator 22 primarily consists of an up-down counter 35 which has its outputs 43 connected to the inputs 44 of a digital to analogue converter 36. The pulse generator 37 supplies an input to a control circuit 38.

The outputs of the comparator 33 and 34 are connected to the count up input 41 or the count down input 42 of the up-down counter 35 by way of lines 30 and by way of the AND gates 39 and 40 of the control circuit 38.

The data outputs 43 of the up-down counter 35 are connected to the digital inputs 44 of the digital to analogue transducers 36 which produce analogue voltages at its output which comprise the output 23 of the voltage generator 22. At the output 23 a comparison signal appears which is proportional to the reading of the up-down counter 35. This comparison signal can be changed by counting in our counting out pulses of a counting pulse sequence which can be supplied to the count up or count down inputs R/V of the up-down counter 35.

The counting pulse sequence is produced in the pulse generator 37 which is connected to the count up input 41 of the counter 35 and to the count down input 42 of the counter 35 by way of AND gates 46 and through AND gates 39 and 40 of the control circuit 38. Depending upon the output levels of the comparators 33 and 34, the counting pulse sequence either reaches the count up input 41 or the countdown input 42 of the counter 35.

A voltage generator 22 is switched on by actuating storage key 27 and when closed the RS flip-flop 47 is placed in the H range and the AND gate 46 is enabled. The counting pulse sequence from the pulse generator 37 can then reach the count up or count down inputs of the counter 35.

The comparator 21 and voltage generator 22 operate as follows. The color signal value on input 25 of the comparator 21 may be smaller than the comparison value on input 24 and in this case the output of the comparator 34 lies in the H range and the output of comparator 33 in the L range. The AND gate 40 will be enabled and the counting pulse sequence from the pulse generator 37 will reach the count up input 41 of the counter 35 so as to continuously increase the counting value accumulated in the counter. The comparison signal on the analogue output 23 of the D/A transducer 36 will linearly increase. If the color signal value is equal to the comparison value, the outputs of both comparators 33 and 34 will lie in the L range and the AND gates 39 and 40 will be blocked. In this condition, the reading of the counter 35 and also the instantaneous value of the analogue comparison signal at the output of the digital to analogue transducer 36 will be fixed at a constant value.

The comparator 21 could also be constructed as a digital comparator and for this purpose the color signal value fed to the comparator would be in digital form and the counter reading of the up-down counter 35 is used as a comparison value.

It is also possible to introduce an advance counter instead of the up-down counter 35.

The advance-counter would have to be reset each time prior to initiation of adjustment and the counting operation would have to be started and stopped depending upon the output level of the comparator 21.

The voltage generator 22 could also be constructed from a saw tooth generator or a step-voltage such as a staircase voltage generator and an analogue memory connected to the output side.

For manual adjustment, the comparison signal could also be set with a potentiometer and the value of comparison could be obtained with the use of a voltmeter.

Figure 3:
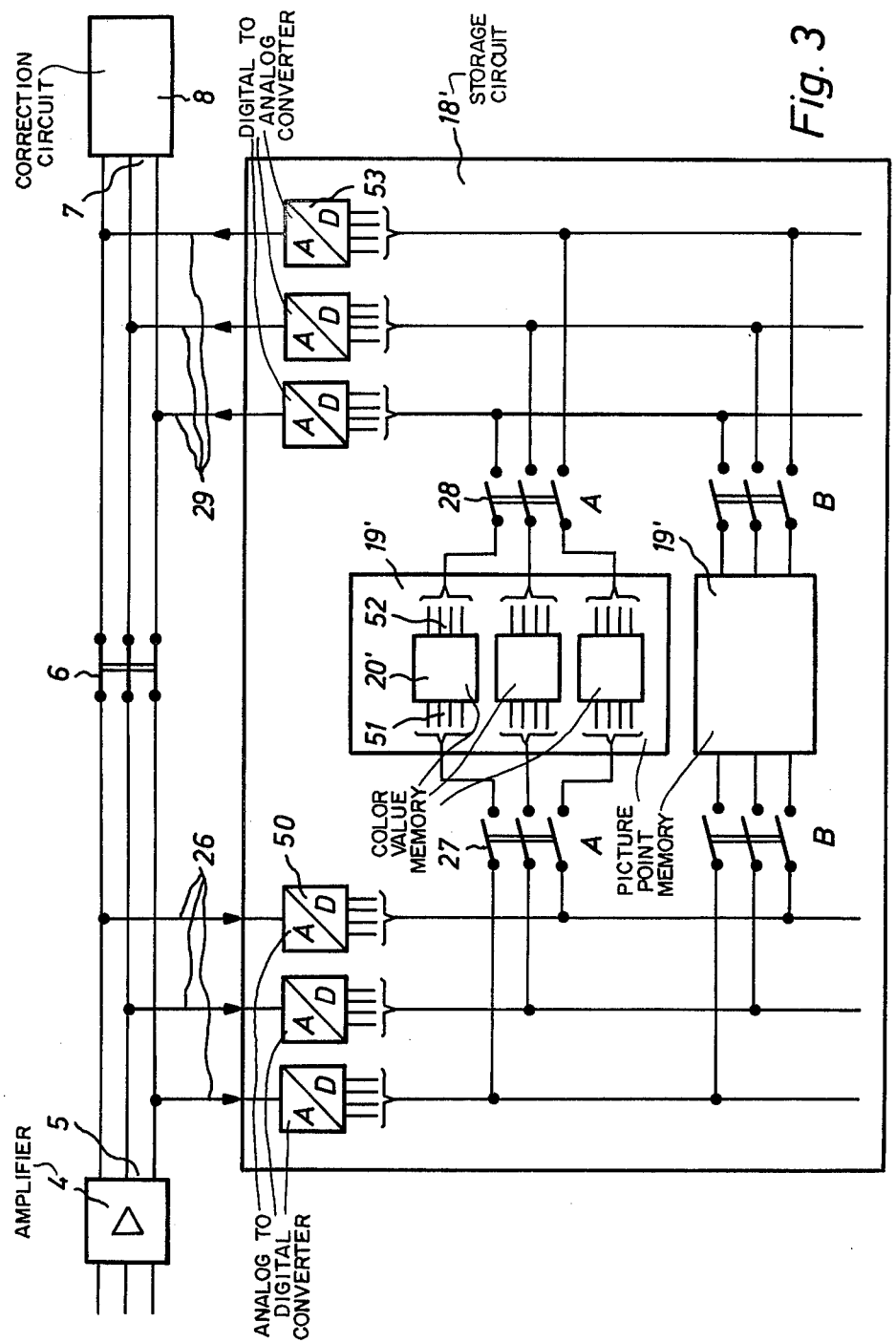
FIG. 3 illustrates a modified form of the memory storage circuit.

FIG. 3 illustrates a further sample embodiment of a storage circuit 18'. The storage circuit 18' consists of two picture point memories 19' only one of which is illustrated in detail in FIG. 3. Picture point memory 19' is constructed to using three color value memories 20' which are digital memories in the sample embodiment illustrated.

In the storage circuit 18' outputs 5 from amplifier 4 are connected to data inputs 51 of color value memories 20' through lines 26. The A/D transducer 50 and the storage keys 27 are between the lines 26 and the storage key 27. The data outputs 52 of the color value memories 20' are connected to the inputs 7 of the correction circuit 8 through the recall keys 28, the D/A transducers 53 by way of lines 29. The storage circuits 18' operate in the same fashion as the storage circuits 18 which have been described above.

If the color measuring values supplied by the scanning device are already present in digital form and if correction circuit 8 also functions with digital signals the A/D transducers 50 and the D/A transducers 53 can be eliminated.

It is seen that this invention comprises a novel correction circuit for printing systems and although it has been described with respect to preferred embodiments, it is not to be so limited as changes and modifications may be made which are within the full intended scope of the invention as defined by the appended claims.

I claim as my invention

1. A system for improved adjustment of a correction circuit having a plurality of inputs in a color scanner in which a photo electric scanning device scans a master having a plurality of picture points for obtaining color signals, a correction circuit connected to the output of said scanning device for correcting the color signals, wherein a switch is connected between said scanning device and said correction circuit such that said switch can be opened during the adjustment of said correction circuit, a plurality of adjustable memories with one for each picture point which is to be examined connected to said scanning device for storing the color signal values of the associated picture point, and the outputs of said plurality of memories connected to the inputs of said correction circuit for the adjustment of the individual correction values of color signal paths of said correction circuit.

2. A system according to claim 1 wherein each of said plurality of memories include a comparator provided for each color signal value of the picture points to be examined with a first input of said comparator connected to said scanning device and assigned with a color signal value, a voltage generator which can be selectively turned on connected to the output of said comparator and the output of said voltage generator connected to a second input of said comparator and where when different input signals are supplied to said comparator, said generator produces a steadily changing voltage, and when said signals are the same said generator produces a fixed signal value and retains said instantaneous signal value and said output voltage of said generator connected, respectively, to the inputs of said correction circuit for the adjustment of individual correction factors in said correction circuit.

3. A system according to claim 1 including an analogue to digital transducer for each color signal connected to the output of said scanning device and said memories each having a digital memory for each color signal value which receives a data input from the associated analogue to digital transducer and including digital to analogue converters receiving the outputs of said digital memories for the adjustment of the individual correction values.

4. A correction circuit for a scanning system having a scanning means producing a plurality of output signal voltages from a picture master and a recording means comprising a first switching means receiving the output signal voltages from said scanning means, a correction circuit connected to the first switching means and connectable to said scanning means, a memory means connected to said scanning means for individually storing said plurality of output signal voltages associated with discrete picture points of said picture master, and second switching means connected to said memory means for selectively supplying said stored signal voltage to said correction circuit.

5. A correction circuit according to claim 4 wherein said memory means has separate portions for storing one or more signal values associated with particular picture points and each separate portion has for each signal value a comparator which receives said signal value, a voltage generator receiving the output of said comparator and supplies an input to said comparator and the output of said voltage generator connected to said second switching means to supply a correction signal to said correction circuit.

6. A correction circuit according to claim 5 including means for selectively energizing said voltage generator.

* * * * *